(12) United States Patent
Alawadhi

(10) Patent No.: US 9,399,866 B2
(45) Date of Patent: Jul. 26, 2016

(54) THERMAL BARRIER PANEL WITH SELECTABLE PHASE CHANGE MATERIALS

(71) Applicant: KUWAIT UNIVERSITY, Safat (KW)

(72) Inventor: Esam M. Alawadhi, Al-Andalos (KW)

(73) Assignee: KUWAIT UNIVERSITY, Safat (KW)

( * ) Notice: Subject to any disclaimer, the term of this patent is extended or adjusted under 35 U.S.C. 154(b) by 199 days.

(21) Appl. No.: 14/183,348

(22) Filed: Feb. 18, 2014

(65) Prior Publication Data

US 2015/0233115 A1  Aug. 20, 2015

(51) Int. Cl.
| | |
|---|---|
| *F28D 20/02* | (2006.01) |
| *E04B 9/00* | (2006.01) |
| *G01K 13/00* | (2006.01) |
| *F24J 2/54* | (2006.01) |
| *F24J 2/34* | (2006.01) |

(52) U.S. Cl.
CPC . *E04B 9/001* (2013.01); *F24J 2/34* (2013.01); *F24J 2/54* (2013.01); *F28D 20/02* (2013.01); *G01K 13/00* (2013.01)

(58) Field of Classification Search
CPC ........... F24J 2/34; F24J 2/0422; F24J 2/0007; F28D 20/02; F28D 20/028; F28D 20/026; F28D 20/023; Y02E 60/145
USPC ..................................... 126/617, 618; 165/10
See application file for complete search history.

(56) References Cited

U.S. PATENT DOCUMENTS

| | | | |
|---|---|---|---|
| 4,290,416 A * | 9/1981 | Maloney | ..................... F24J 2/34 126/400 |
| 4,482,010 A | 11/1984 | Cordon | |
| 4,739,748 A * | 4/1988 | Stice | ....................... E06B 9/386 126/618 |
| 5,532,039 A | 7/1996 | Payne et al. | |
| 5,755,216 A | 5/1998 | Salyer | |

(Continued)

FOREIGN PATENT DOCUMENTS

| | | |
|---|---|---|
| CA | 1261696 A1 | 9/1989 |
| CN | 101832001 A | 9/2010 |

(Continued)

OTHER PUBLICATIONS

Peiffer, FR2524128TRANS (English Translation), Sep. 1983.*

(Continued)

*Primary Examiner* — M. Alexandra Elve
*Assistant Examiner* — Eric Ruppert
(74) *Attorney, Agent, or Firm* — Richard C. Litman

(57) ABSTRACT

A thermal barrier panel with selectable phase change materials includes a thermal panel and a plurality of containers movably positioned within the thermal panel to correspond to a heat load at a corresponding ambient temperature. Each of the plurality of containers includes a plurality of receptacles that include a plurality of different phase change materials. Each of the plurality of different phase change materials absorbs thermal energy produced by heat from the heat load at a corresponding ambient temperature. Each of the plurality of different phase change materials are positioned in a corresponding receptacle within a corresponding container, and each of the plurality of receptacles in a corresponding container include one of the plurality of different phase change materials. Corresponding ones of the plurality of receptacles are movably positioned to place a corresponding phase change material in facing relation to the heat load based upon the corresponding ambient temperature.

6 Claims, 6 Drawing Sheets

(56) References Cited

U.S. PATENT DOCUMENTS

| | | | |
|---|---|---|---|
| 5,770,295 | A | 6/1998 | Alderman |
| 7,571,758 | B2 | 8/2009 | Pause |
| 2005/0055982 | A1 | 3/2005 | Medina |
| 2008/0008858 | A1 | 1/2008 | Hong et al. |
| 2009/0294093 | A1 | 12/2009 | Pause |
| 2012/0305435 | A1 | 12/2012 | Matta et al. |

FOREIGN PATENT DOCUMENTS

| | | | |
|---|---|---|---|
| CN | 201802003 U | | 4/2011 |
| DE | 4209251 | * | 8/1992 |
| EP | 0830438 B1 | | 1/1999 |
| EP | 1703033 A2 | | 9/2006 |
| EP | WO 2007082559 A1 | | 7/2007 |
| EP | 1656239 B1 | | 1/2010 |
| EP | 2239388 A1 | | 10/2010 |
| FR | 2524128 | * | 9/1983 |
| WO | WO 9842929 | | 10/1998 |

OTHER PUBLICATIONS

Frommhold, DE4209251TRANS (English Translation), Aug. 1992.*

Zhang et al., "Application of latent heat thermal energy storage in buildings : State-of-the-art and outlook," *Building and Environment*, vol. 42, pp. 2197-2209, 2007.

Khudhair et al., "A review on energy conservation in building applications with thermal storage by latent heat using phase change materials," *Energy Conversion and Management*, vol. 45, No. 2 pp. 263-275, 2004.

Zhu at al., "Dynamic characteristics and energy performance of buildings using phase change materials: A review," *Energy Conversion and Management*, vol. 50, No. 12, pp. 3169-3181, 2009.

Cabeza et al., "Materials used as PCM in thermal energy storage in buildings: A review," *Renewable & Sustainable Energy Review*, vol. 15, No. 3 pp. 1675-1695, 2011.

Alawadhi, Esam M. "Thermal analysis of a building brick containing phase change material," *Energy and Buildings*, vol. 40, No. 3, pp. 351-357, 2008.

Castell et al., "Experimental study of using PCM in brick constructive solutions for passive cooling," *Energy and Buildings*, vol. 42, No. 4, pp. 534-540, 2010.

Zhang et al., "Thermal response of brick wall filled with phase change materials (PCM) under fluctuating outdoor temperatures," *Energy and Buildings*, vol. 43, No. 12, pp. 3514-3520, 2011.

Principi et al., "Thermal analysis of the application of pcm and low emissivity coating in hollow bricks," *Energy and Buildings*, vol. 51, pp. 131-142, 2012.

Silva et al., "Experimental testing and numerical modelling of masonry wall solution with PCM incorporation: A passive construction solution," *Energy and Buildings*, vol. 49, pp. 235-245, 2012.

Alawadhi et al., "Building roof with conical holes containing PCM to reduce the cooling load: Numerical study," *Energy Conversion and Management*, vol. 52, No. 8-9, pp. 2958-2964, 2011.

Alqallaf et al., "Concrete roof with cylindrical holes containing PCM is reduce the heat gain," *Energy and Buildings*, vol. 61, pp. 73-80, 2013.

Kośny et al., "Field thermal performance of naturally ventilated solar roof with PCM heat sink," *Solar Energy*, vol. 86, Issue 9, pp. 2604-2614, 2012.

Ravikumar et al., "Year Round Performance of PCM Filled RCC Roof for Thermal Management," *European Journal of Scientific Research*, vol. 61 Issue 3, pp. 424, Oct. 2011.

Pasupathy et al., "Experimental investigation and numerical simulation analysis on the thermal performance of a building roof incorporating phase change material (PCM) for thermal management," *Applied Thermal Engineering*, vol. 28 Issues 5-6, pp. 556-565, 2008.

Pasupathy et al., "Effect of double layer phase change material in building roof for year round thermal management," *Energy and Buildings*, vol. 40 Issue 3, pp. 193-203, 2008.

* cited by examiner

THERMAL BARRIER PANEL WITH SELECTABLE PHASE CHANGE MATERIALS

BACKGROUND OF THE INVENTION

1. Field of the Invention

The present invention relates to thermal efficient building materials, and particularly to a thermal barrier panel with selectable phase change materials.

2. Description of the Related Art

Relatively higher temperatures can often increase the use of cooling systems, such as air conditioning systems, to assist in maintaining thermal comfort for occupants in buildings. A rate of external heat penetrating into buildings, which is a component of thermal load and can cause the temperature within the building to rise, can depend on a number of factors, such as the thermal resistance of the building materials.

A current approach for increasing the thermal resistance of building materials to decrease the rate of external heat penetrating into a building can include placing phase change materials (PCMs) within the building material for incorporation of the PCMs within a building envelope or an area of a building or other structure, for example. Various known PCM materials can include, for example, ThermalCORE™ produced by National Gypsum, various thermal mass panels, such as produced by DuPont™, ThermaCool® produced by Datum Phase Change, Ltd., and micrometer-sized beads such as the Micronal® PCM produced by BASF.

PCMs can allow for the reduction of heat gain into the building and can also allow for the conservation of the cooling load by each PCM having a generally fixed melting temperature, as can also have a melting temperature range. PCMs can be organic or inorganic substances that can have a relatively lower melting temperature, such as paraffin and salt, for example. PCMs can allow for the reduction of heat gain into the building and can also allow for the conservation of the cooling load by each PCM having a generally fixed melting temperature, as can also have a melting temperature range. For example, when an outdoor temperature reaches a melting temperature or a melting point of the PCM, the PCM can melt and absorb the heat, and thus can prevent a portion of the external heat from penetrating into an interior space of the building or structure.

Further, building materials incorporating PCMs, such as PCM panels, can be typically placed at an outer surface of the building, such as a roof or a wall of the building, or can be incorporated into other portions of the building, such as in a window shutter, for example. A possible issue with current building materials having PCM as a heat absorption material is that the current heat absorption materials use only a single PCM, which can cause inefficiency in the heat absorption.

Therefore, it is desirable for a building material to contain multiple different PCMs to absorb external heat at various ambient temperatures to enhance the reduction of heat gain into an interior of a building or other structure.

Thus, a thermal barrier panel with selectable phase change materials addressing the aforementioned problems is desired.

SUMMARY OF THE INVENTION

Embodiments of a thermal barrier panel with selectable phase change materials include a thermal panel and a plurality of containers adapted to be movably positioned within the thermal panel to correspond to a heat load at a corresponding ambient temperature. Each of the plurality of containers includes a plurality of receptacles adapted to include a plurality of different phase change materials. Each of the plurality of different phase change materials respectively absorbs thermal energy produced by heat from the heat load at a corresponding ambient temperature. Each of the plurality of different phase change materials being adapted to be positioned in a corresponding receptacle within a corresponding container, and each of the plurality of receptacles in a corresponding container includes one of the plurality of different phase change materials. Corresponding ones of the plurality of receptacles are movably positioned to place a corresponding phase change material in facing relation to the heat load based upon the corresponding ambient temperature.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
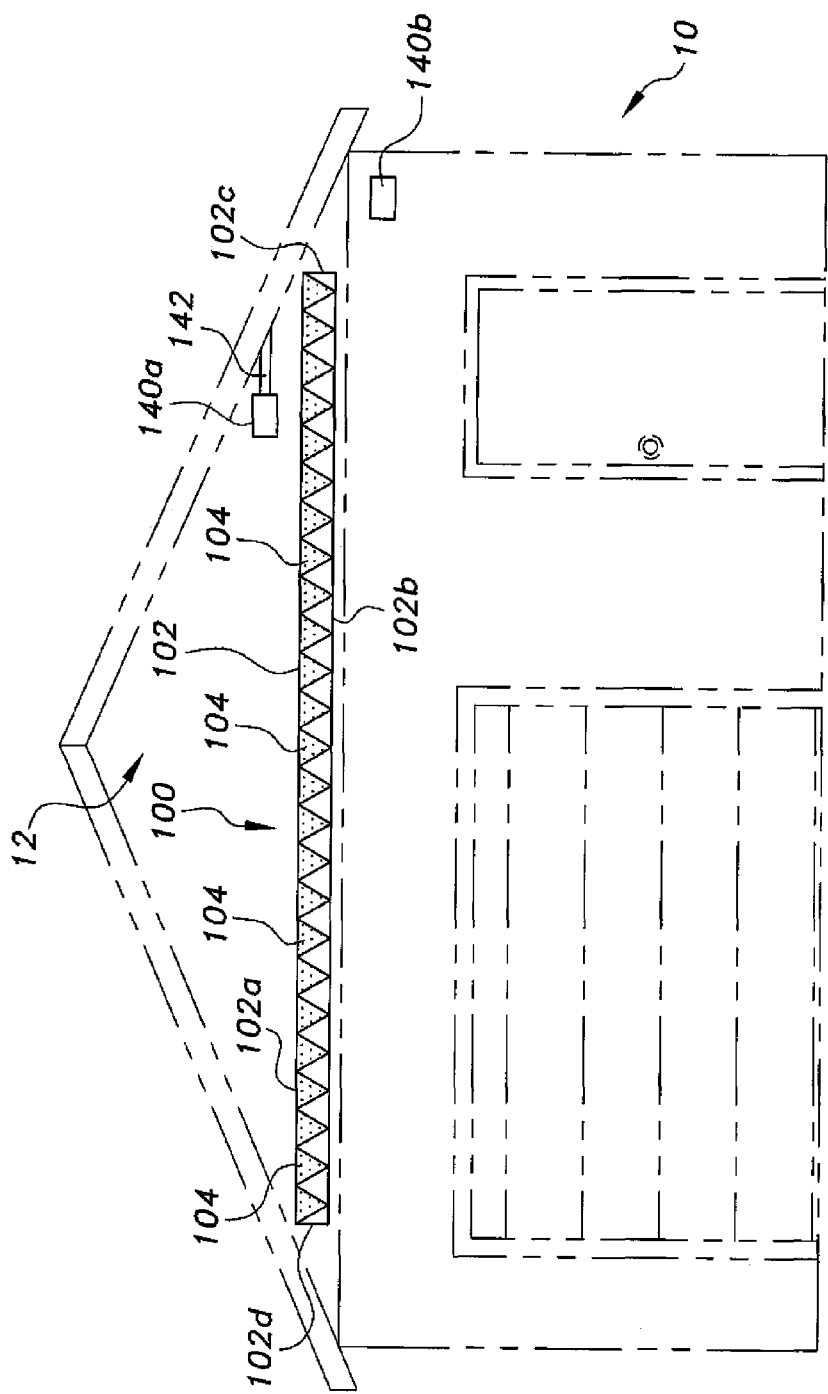
FIG. 1 is an environmental view of an embodiment of a thermal barrier panel with selectable phase change materials incorporated in a structure according to the present invention.

Referring to FIG. 1, an environmental view of an embodiment of a thermal barrier panel 100 with selectable phase change materials is illustrated incorporated in a structure 10. The thermal barrier panel 100 can be positioned in various locations within or on an exterior of the structure 10, such as in the attic 12 of the structure 10, or an outer wall of the structure 10, for example. Other examples of use and placement of the thermal barrier panel 100 in the structure 10, such as a building or home, can include placing the thermal barrier panel 100 in conjunction with various inner or outer surfaces of the roof, walls, doors or window shutters of the structure 10, depending on the use or application, and should not be construed in a limiting sense. The thermal barrier panel 100 includes a thermal panel 102.

Figure 5:
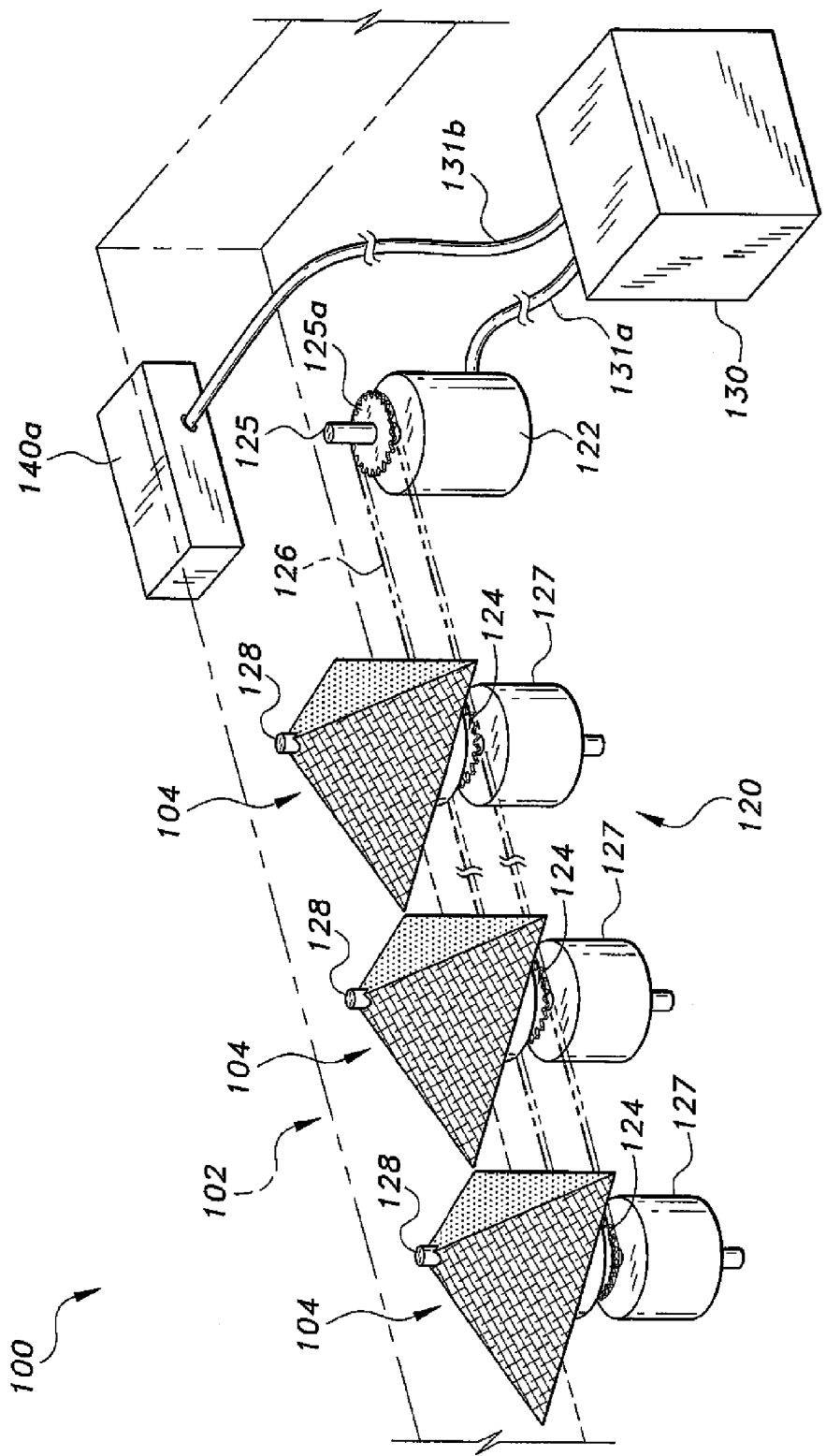
FIG. 5 is a perspective view of an embodiment of a thermal barrier panel with selectable phase change materials associated with a drive assembly, a controller, and a temperature sensor according to the present invention.

Referring to FIGS. 1-4C, the thermal panel 102 includes a plurality of containers 104, such as can be placed in a side by side arrangement to form a generally close panel arrangement, such as illustrated in FIGS. 1-4C. The plurality of containers 104 are adapted to be movably positioned within the thermal panel 102 to correspond to a heat load H at a corresponding ambient temperature, such as can be measured by at least one temperature sensor 140a or 140b, for example, as shown in FIGS. 1 and 5. The at least one temperature sensor 140a, 140b can be suitably mounted in relation to the structure 10, such as by a suitable mounting member 142, associated with the temperature sensor 140a, or as by a suitable adhesive or fastener as in conjunction with the temperature sensor 140b for example. Also, the at least one temperature sensor 140a, 140b can be positioned in conjunction with the thermal panel 102, for example.

Each of the plurality of containers 104 includes a plurality of receptacles 108a, 108b, and 108c. Further included in each container 104 of the plurality of containers 104 are a plurality of different phase change materials 110a, 110b, and 110c, as shown for example in FIGS. 2-4C. Each of the plurality of different phase change materials 110a, 110b, and 110c absorb thermal energy produced by heat from the heat load H at the corresponding ambient temperature.

The thermal panel 102 can have a generally hollow interior 101 that includes the plurality of containers 104. The thermal panel 102 also includes a plurality of outer surfaces 102a, 102b, 102c, and 102d forming the generally hollow interior 101. At least one of the plurality of outer surfaces 102a, 102b, 102c, and 102d can be a thermally transmissive outer surface to selectively receive and transmit heat to one or more of the plurality of different phase change materials 110a, 110b, and 110c in the plurality of containers 104 to store thermal energy generated by the heat of the heat load H. Also, given the plurality of different phase change materials 110a, 110b, and 110c, the plurality of phase change materials 110a, 110b, and 110c can store thermal energy and/or conserve thermal energy at a plurality of ambient temperatures, for example.

The plurality of different phase change materials 110a, 110b, and 110c are positioned in a corresponding receptacle 108a, 108b, and 108c, within a corresponding container 104. Further, each of the plurality of receptacles 108a, 108b, and 108c in a corresponding container 104 includes a corresponding one of the plurality of different phase change materials 110a, 110b, and 110c. For example, in a container 104 the receptacle 108a includes a phase change material 110a, the receptacle 108b includes a different phase change material 110b, and the receptacle 108c includes another different phase change material 110c. It should be noted that the number of different phase change materials is not necessarily limited to the three different phase change materials 110a, 110b, and 110c described herein, in that any suitable number of a plurality of phase change materials can be positioned in a corresponding number of receptacles, such as the plurality of receptacles 108a, 108b, and 108c, within a corresponding container 104, depending on the use or application, and should not be construed in a limiting sense.

Further, the plurality of containers 104 can be of various suitable geometric shapes, such as a generally pyramidal shape as can include an equilateral pyramid, as illustrated in FIGS. 2-4C, for example. Other suitable shapes for the plurality of containers 104 can include a cylindrical shape, a rectangular shape, a cubic shape, or other suitable prismatic shapes, depending upon the use or application, for example, and should not be construed and limiting sense.

The receptacles 108a, 108b, and 108c in each container 104 of the plurality of containers 104 can be of various suitable shapes, depending on the use or application, such as a generally isosceles triangular shape, including one or more boundaries 112 to separate the different phase change materials 110a, 110b, and 110c in a corresponding container 104.

Figure 2:
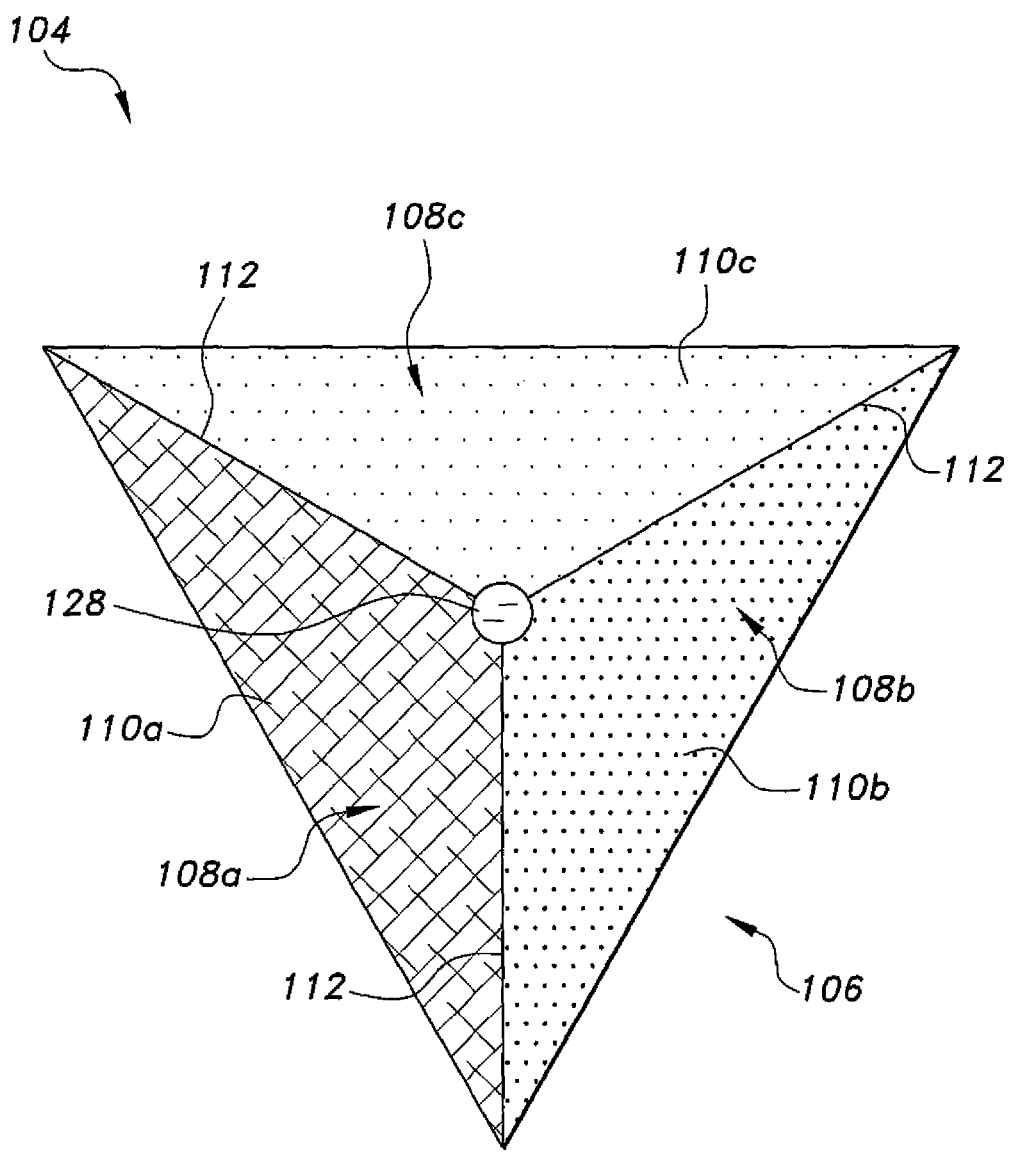
FIG. 2 is a top view of an embodiment of a container of a thermal barrier panel including a plurality of receptacles with selectable phase change materials according to the present invention.
Figure 3:
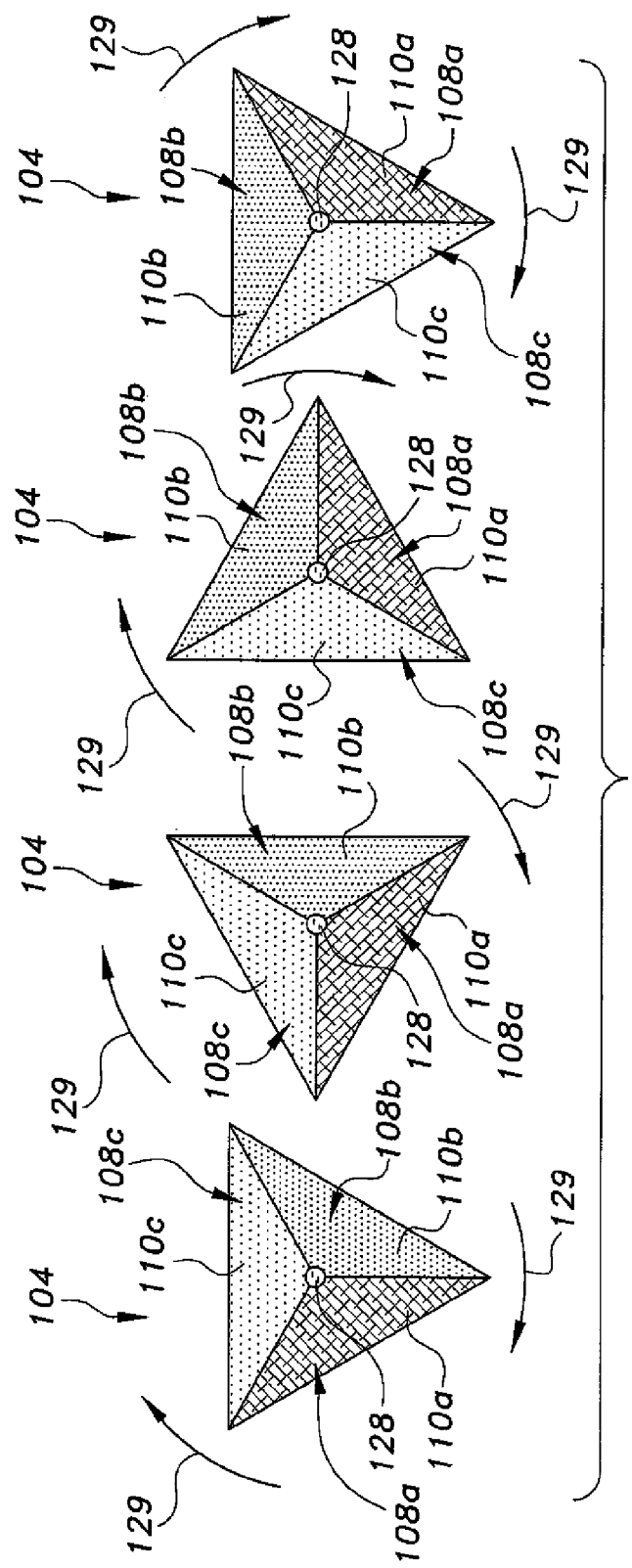
FIG. 3 is a schematic top view illustrating rotatable movement of a plurality of containers including a plurality of receptacles with selectable phase change materials according to the present invention.
Figure 4A:
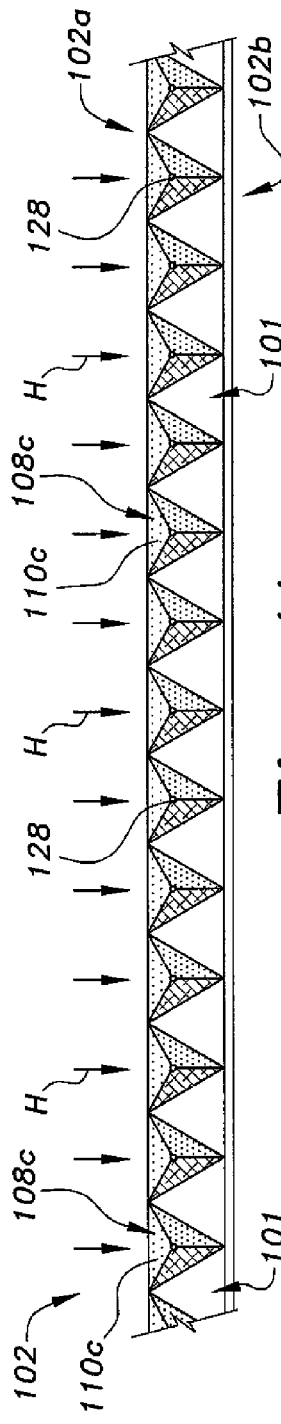
FIGS. 4A, 4B, and 4C are sectional views of a thermal panel with selectable phase change materials illustrating corresponding ones of the plurality of receptacles movably positioned to place a corresponding phase change material in facing relation to the heat load based upon the corresponding ambient temperature according to the present invention.
Figure 4B:
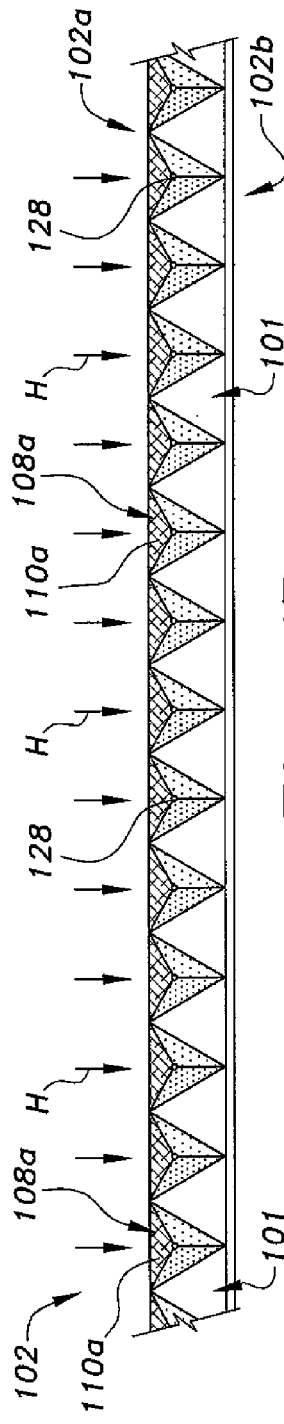
Figure 4C:
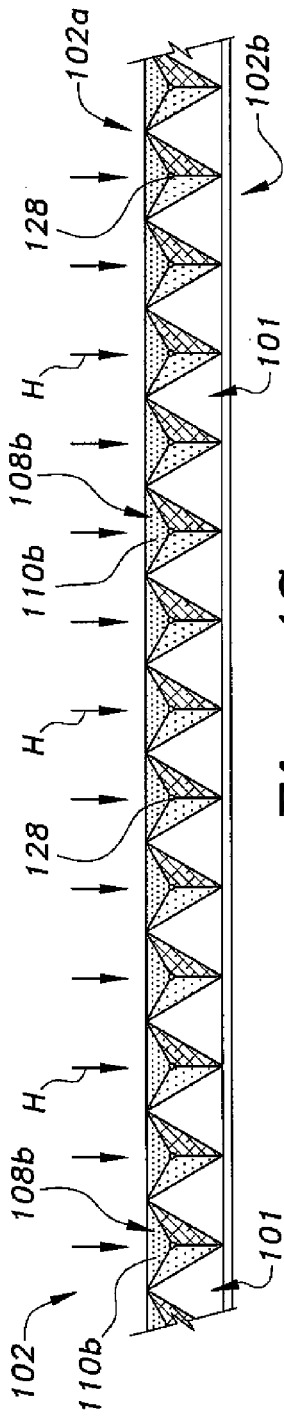

The boundaries 112 can be of various suitable configurations such as a generally triangular shaped boundary 112 corresponding to a generally isosceles shaped receptacle 108a, 108b, and 108c, as shown in FIG. 2, for example, and should not be construed in a limiting sense.

The plurality of different phase change materials 110a, 110b, and 110c can be any of various suitable materials. For example, the plurality of different phase change materials 110a, 110b, and 110c can include one or more of a paraffin material, a copolymer material, and a salt, depending use or application, and should not be construed in a limiting sense. Also, the plurality of different phase change materials 110a, 110b, and 110c can desirably have a relatively low melting point or melting temperature different from each other, as can also have a melting temperature range, to absorb an amount of thermal energy produced by heat from the heat load H at a corresponding ambient temperature, as well as can conserve a cooling load for at least a period of time, produced by a cooling system, such as an air conditioning system, for example.

Further, the thermal panel 102, including the plurality of outer surfaces 102a, 102b, 102c, and 102d, can be formed from any of various suitable materials. Suitable materials for the thermal panel 102 including the plurality of outer surfaces 102a, 102b, 102c, and 102d can include one or more of a heat transmissive material, a gypsum material, a cement material, a wood, a metallic material, and an aluminum laminate material, for example, and should not be construed in a limiting sense.

The at least one temperature sensor 140a and 140b is adapted to detect at least one ambient temperature, such as a room or an area temperature within the structure 10, or an ambient temperature exterior to the structure 10, for example. Referring to FIGS. 1 and 5, the at least one temperature sensor 140a and 140b is in communication with a controller 130 through a communication line 131b. The controller 130 communicates with the at least one temperature sensor 140a, 140b to receive at least one detected ambient temperature. Also, the controller 130 can wirelessly communicate with the at least one temperature sensor 140a, 140b, such as through a suitable transceiver/receiver arrangement, for example.

The controller 130 directs movably positioning the plurality of containers 104 to position corresponding ones of the plurality of receptacles 108a, 108b, and 108c to place a corresponding phase change material 110a, 110b, or 110c in facing relation to the heat load H based on the detected at least one ambient temperature by the at least one temperature sensor 140a, 140b, such as can automatically replace a corresponding phase change material 110a, 110, or 110c having a given melting temperature or melting point with another different phase change material 110a, 110b, or 110c having a different given melting temperature or melting point in facing relation to the heat load H.

The at least one temperature sensor 140a, 140b can periodically, continuously, or intermittingly read or detect the ambient temperature and provide the reads of the detected ambient temperature to the controller 130, the controller 130 directing rotating the plurality containers 104 based upon the detected ambient temperature to adjust and selectively expose a corresponding phase change material 110a, 110b, or 110e to the heat load H. For example, referring to FIGS. 4A-4C, corresponding receptacles of the plurality of receptacles 108a, 108b, and 108c are movably positioned to place a corresponding phase change material 110a, 110b, or 110c in facing relation to the heat load H based upon the corresponding ambient temperature, such as detected by at least one temperature sensor 140a, 140b, for example.

Referring to FIGS. 1-6, with particular reference to FIGS. 4A, 4B, 4C, and 5, the thermal barrier panel 100 is associated with a drive assembly 120, as can be included within or in conjunction with the thermal panel 102. The drive assembly 120 movably positions the plurality of containers 104 based on direction from the controller 130 in communication with the drive assembly 120. In this regard, the controller 130 selectively controls the drive assembly 120 to selectively move and position the plurality of containers 104.

The drive assembly 120 further includes a motor 122, such as can be a suitable electric motor, for example. The motor 122 is selectively driven by the controller 130 and is in communication with the controller 130, such as by a communication line 131a. Also, the motor 122 and the controller 130 can be included within or in conjunction with the thermal panel 102, for example. Also, the controller 130 can wirelessly communicate with the motor 122, such as through a suitable transceiver/receiver arrangement, for example. Further, a suitable power supply, such as a battery or external power source, can power one or more of the motor 122, the controller 130 and/or the at least one temperature sensor 140a, 140b, for example.

The drive assembly 120 can also include a plurality of drive gears 124 adapted to be driven by the motor 122. The motor 122 includes a motor drive shaft 125 in conjunction with a corresponding motor drive gear 125a. The motor drive gear 125a through the motor drive shaft 125 is in communication with the motor 122. The plurality of drive gears 124 are in communication with the motor 122 through a linking member 126, the linking member 126 being in communication with the motor drive gear 125a, to selectively drive the movement of the plurality of containers 104 to selectively position the plurality of containers 104, based on the detected ambient temperature, for example. The linking member 126 can be any of various suitable engagement members, such as at least one of a drive chain or a drive belt, which engages the plurality of drive gears 124 to move the drive gears 124 when the linking member 126 is driven by the motor 122.

The drive assembly 120 can further include a plurality of support bases 127. The plurality of support bases 127 is respectively associated with each of the plurality of containers 104. The plurality of support bases 127 can be any suitable mounting member to support the plurality of containers 104 within the thermal panel 102, such as a cylindrical mounted base made out of a suitable material, such as a plastic or a metallic material, for example. Each of the plurality of support bases 127 can have a rotatable shaft 128 mounted in conjunction with a corresponding support base 127 for rotatable movement of a corresponding container 104, such as by at least one of a journal or pivotal type arrangement, for example.

The rotatable shaft 128 is in communication with a corresponding one of the plurality of drive gears 124 and is positioned in conjunction with a corresponding container 104 to selectively move and position the corresponding container 104, such as by pivotal or rotational movement of the rotatable shaft 128, such as in conjunction with a standard pivot, pivoting mechanism, or journal type arrangement, for example. A rotatable movement 129 of a plurality of corresponding containers 104 is illustrated for example in FIG. 3. As illustrated in FIGS. 2-5, the plurality of containers 104 can selectively rotate about a midpoint of the corresponding container 104 corresponding to the location to the corresponding rotatable shaft 128, for example.

Figure 6:
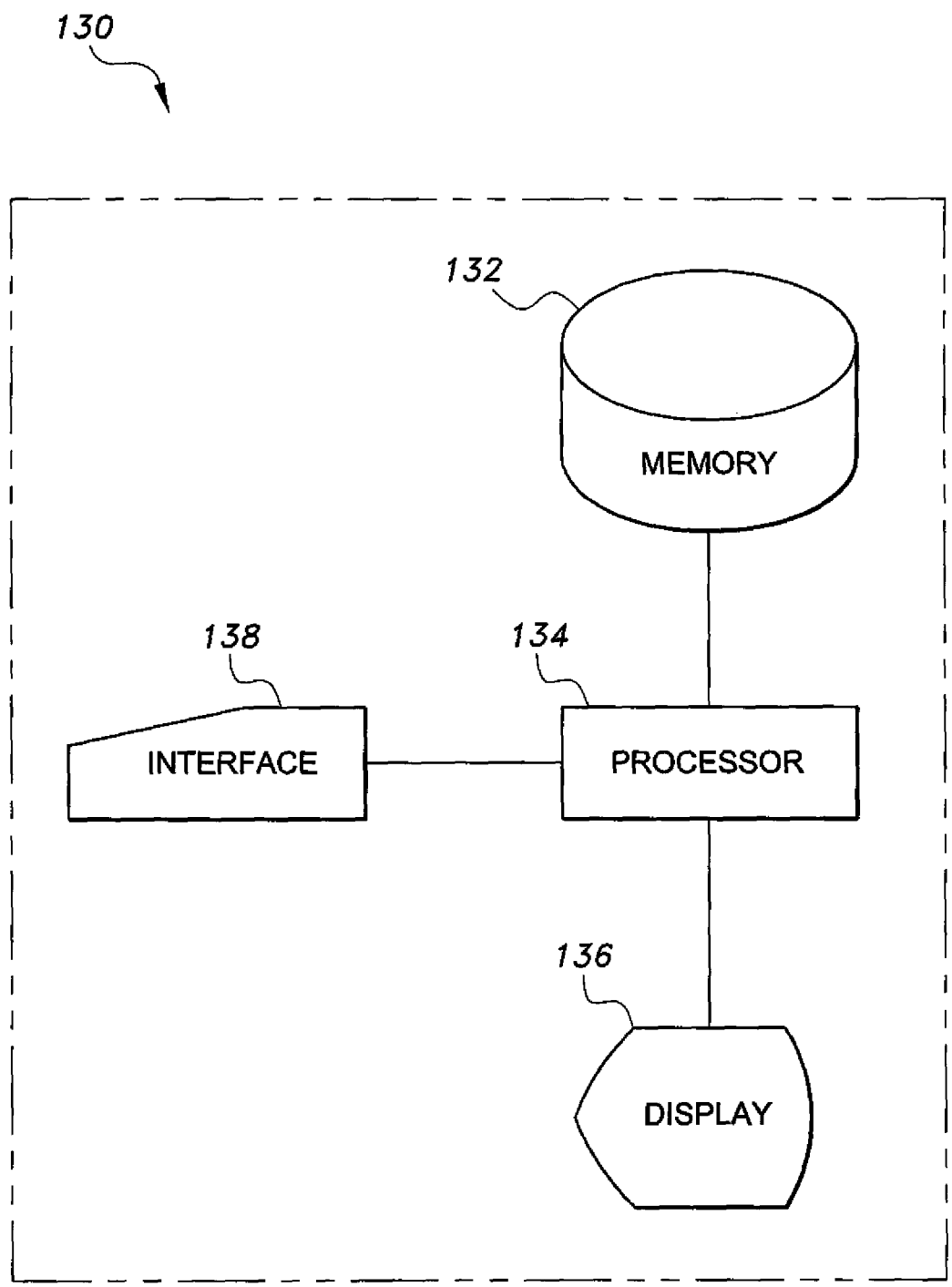
FIG. 6 is a schematic diagram of an embodiment of a controller to control a drive assembly in conjunction with embodiments of a thermal barrier panel with selectable phase change materials according to the present invention.

Referring now to FIG. 6, there is illustrated a schematic diagram of the controller 130 as can be used to control the drive assembly 120 and to receive the detected ambient temperature from the at least one temperature sensor 140a, 140b in conjunction with the thermal barrier panel 100. It should be understood that the controller 130 can represent, for example, a stand-alone computer, computer terminal, portable computing device, networked computer or computer terminal, a microprocessor, an application specific integrated circuit (ASIC), or networked portable device. Data, such as the received measurements of the detected ambient temperature from the at least one temperature sensor 140a, 140b, can be received by the controller 130 by a suitable type of interface 138, and can be stored in a computer readable memory 132, which can be any suitable type of computer readable and programmable memory.

Calculations are performed by the processor 134, which can be any suitable type of computer processor, to determine the selective movement of the plurality of containers 104 to direct movably positioning the plurality of containers 104 to position corresponding ones of the plurality of receptacles 108a, 108b, and 108c, to place a corresponding phase change material 110a, 110b, or 110c, in facing relation to the heat load H based on the detected at least one ambient temperature.

Based upon the determination of the selective movement of the plurality of containers 104, the processor 134 selectively directs through the interface 138 the motor 122 to movably position the plurality of containers 104 accordingly. The detected ambient temperature and/or information related to the selective movement of the plurality of containers 104 can be displayed to an individual on a display 136, which can be any suitable type of computer display, such as an light emitting diode (LED) display, for example.

The processor 134 can be associated with, or incorporated into, any suitable type of computing device, for example, a personal computer or a programmable logic controller. The display 136, the processor 134, the memory 132, and the interface 138 and any associated computer readable media are in communication with one another by any suitable type of data bus, as is well known in the art.

The memory 132 can be one or more of a Secure Digital (SD) card or a MultiMediaCard (MMC) card, among others, for example. Also, examples of computer readable media, as can be used as the memory 132, can include a magnetic recording apparatus, non-transitory computer readable storage memory, an optical disk, a magneto-optical disk, and/or a semiconductor memory (for example, RAM, ROM, etc.). Examples of magnetic recording apparatus that can be used in addition to memory 132, or in place of memory 132, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

I claim:

1. A thermal barrier panel with selectable phase change materials, comprising:
a thermal panel; wherein the thermal panel comprises:
a generally hollow interior formed by a plurality of sides; and
at least one of the plurality of sides defines a thermally transmissive outer surface;
a plurality of containers, wherein the plurality of containers are of a pyramidal shape, the plurality of containers being movably positioned within the thermal panel to correspond to a heat load at a corresponding ambient temperature, each of the plurality of containers including a plurality of receptacles;

a plurality of different phase change materials, each of the plurality of different phase change materials being associated with a respective container, each of the plurality of different phase change materials respectively absorbing thermal energy produced by heat from the heat load at a corresponding ambient temperature, wherein the heat load is transmitted to the respective phase change materials via the thermally transmissive outer surface, each of the plurality of receptacles in a corresponding container including one of the plurality of different phase change materials, wherein each container of the plurality of containers includes each of the plurality of different phase change materials, each of the plurality of different phase change materials being respectively adapted to be positioned in a corresponding receptacle within the container, and wherein corresponding ones of the plurality of receptacles included in the plurality of containers are movably positioned to place a corresponding phase change material in facing relation to the heat load based upon the corresponding ambient temperature;

at least one temperature sensor, the at least one temperature sensor to detect at least one ambient temperature; and a controller, the controller communicating with the at least one temperature sensor to receive at least one detected ambient temperature, the controller directs movably positioning the plurality of containers to position corresponding ones of the plurality of receptacles to place a corresponding phase change material in facing relation to the heat load based on the detected at least one ambient temperature.

2. The thermal barrier panel with selectable phase change materials according to claim 1, further comprising:

a drive assembly, the drive assembly to movably position the plurality of containers, the drive assembly in communication with the controller, the controller controlling the drive assembly to selectively move and position the plurality of containers.

3. The thermal barrier panel with selectable phase change materials according to claim 2, wherein the drive assembly comprises:

a motor, the motor selectively driven by the controller; and a plurality of drive gears adapted to be driven by the motor, the plurality of drive gears in communication with the motor through a linking member to selectively drive the movement of the plurality of containers to selectively position the plurality of containers.

4. The thermal barrier panel with selectable phase change materials according to claim 3, wherein the drive assembly further comprises:

a plurality of support bases respectively associated with each of the plurality of containers, each of the plurality of support bases having a rotatable shaft communicating with a corresponding one of the plurality of drive gears, each of the plurality of shafts positioned in conjunction with a corresponding container to selectively move and position the corresponding container, wherein the linking member is selected from the group consisting of one or more of a drive chain and a drive belt.

5. The thermal barrier panel with selectable phase change materials according to claim 1, wherein each of the plurality of different phase change materials is selected from the group consisting of one or more of a paraffin material, a copolymer material, and a salt.

6. The thermal barrier panel with selectable phase change materials according to claim 5, wherein the thermal panel is formed from a material selected from the group consisting of one or more of a gypsum material, a cement, a wood, a metallic material, and an aluminum laminate material.

* * * * *